(12) United States Patent
Hawkins et al.

(10) Patent No.: US 9,204,254 B2
(45) Date of Patent: Dec. 1, 2015

(54) DETERMINING ATTRACTIONS BASED ON LOCATION HISTORY DATA

(71) Applicant: Google Inc., Mountain View, CA (US)

(72) Inventors: Dale Kris Hawkins, Erie, CO (US); Guang Yang, San Jose, CA (US); Thomas Carl Stamm, Louisville, CO (US); James A. Guggemos, Windsor, CO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/506,715

(22) Filed: Oct. 6, 2014

(65) Prior Publication Data

US 2015/0024784 A1 Jan. 22, 2015

Related U.S. Application Data

(63) Continuation of application No. 14/086,710, filed on Nov. 21, 2013, now Pat. No. 8,855,684, which is a continuation of application No. PCT/US2013/047175, filed on Jun. 21, 2013.

(Continued)

(51) Int. Cl.
*H04W 24/00* (2009.01)
*H04W 4/02* (2009.01)
*G06F 17/30* (2006.01)
*H04L 29/08* (2006.01)
*H04W 64/00* (2009.01)

(52) U.S. Cl.
CPC ........... *H04W 4/02* (2013.01); *G06F 17/30058* (2013.01); *G06F 17/3087* (2013.01); *H04L 67/18* (2013.01); *H04W 64/00* (2013.01)

(58) Field of Classification Search
CPC .. H04W 4/02; H04W 64/00; G06F 17/30058; G06F 17/3087; H04L 67/18
USPC ............... 455/456.3, 457; 701/467; 705/7.34; 707/765, 769, 748; 709/219
See application file for complete search history.

(56) References Cited

U.S. PATENT DOCUMENTS

| 8,204,966 B1 | 6/2012 | Mendis et al. |
| 8,612,134 B2 * | 12/2013 | Zheng et al. ................... 701/400 |
| 2002/0052674 A1 | 5/2002 | Chang et al. |

(Continued)

OTHER PUBLICATIONS

International Preliminary Report on Patentability from PCT/US2013/047175, 8 pages, mailed Dec. 31, 2014.

(Continued)

*Primary Examiner* — Amancio Gonzalez
(74) *Attorney, Agent, or Firm* — Shumaker & Sieffert, P.A.

(57) ABSTRACT

Techniques are disclosed herein that generally involve storing a historical record of a user's maps searches (a maps history), and providing a user with relevant information about elements in their maps history based on the location of a mobile device associated with the user. Such elements can include generic queries, specific queries, direction queries, click entries, places, and so forth. In some examples, the mobile device's location is provided to a server, which in turn processes the user's maps history to determine which elements from the maps history may be relevant to the mobile device's current location. Elements that are determined to be of possible relevance, and/or information relating thereto, can then be presented to the user, in many instances decreasing the time and effort required for the user to locate map-based information for which they are searching.

19 Claims, 10 Drawing Sheets

Related U.S. Application Data

(60) Provisional application No. 61/662,952, filed on Jun. 22, 2012, provisional application No. 61/663,769, filed on Jun. 25, 2012, provisional application No. 61/663,052, filed on Jun. 22, 2012, provisional application No. 61/663,780, filed on Jun. 25, 2012.

(56) References Cited

U.S. PATENT DOCUMENTS

| | | |
|---|---|---|
| 2008/0270579 A1 | 10/2008 | Herz et al. |
| 2010/0185605 A1* | 7/2010 | Chu et al. ............... 707/722 |
| 2011/0054776 A1 | 3/2011 | Petrov et al. |
| 2013/0103697 A1 | 4/2013 | Hill et al. |

OTHER PUBLICATIONS

International Search Report and Written Opinion from PCT/US2013/047175, 11 pages, mailed Oct. 9, 2013.

Crook et al., "Making Search Yours," Feb. 17, 2011, pp. 1-4, retrieved from the Internet: URL:http://www.bing.com/blogs/site_blogs/b/search/archive/2011/02/10/making-search-yours.aspx [retrieved on Sep. 25, 2013].

Anonymous, "Recent Searches Google Maps", Jun. 3, 2012, pp. 1-2, retrieved from the Internet: URL:http://forum.xda.developers.com/showthread.php?t=1686746 [retrieved on Sep. 25, 2013].

* cited by examiner

| Latitude | Longitude | Date | Time | Accuracy (m) |
|---|---|---|---|---|
| 28.3863 | -81.5382 | 2/1/2012 | 1200 | 20 |
| 28.3550 | -81.6262 | 2/2/2012 | 0900 | 3 |

FIG. 8

DETERMINING ATTRACTIONS BASED ON LOCATION HISTORY DATA

This application is a Continuation of U.S. application Ser. No. 14/086,710, filed Nov. 21, 2013, which is a Continuation of U.S. Application Serial No. PCT/US2013/047175, filed Jun. 21, 2013, which claims the benefit of U.S. Provisional Application No. 61/662,952, filed Jun. 22, 2012, U.S. Provisional Application No. 61/663,769, filed Jun. 25, 2012, U.S. Provisional Application No. 61/663,052, filed Jun. 22, 2012, and U.S. Provisional Application No. 61/663,780, filed Jun. 25, 2012, the entire contents of each of which are hereby incorporated by reference.

BACKGROUND

Many software applications are capable of displaying interactive geographic maps to a user. These applications can be executed using a computer system such as a laptop computer, mobile phone, desktop computer, or tablet computer, and can enable a user to search a map for geographic locations or points of interest, access directions from one geographic location to another, or view one or more layers of information on the map (e.g., satellite images, traffic conditions, topography, political boundaries, and so forth).

Users may conduct maps searches using these applications for any number of reasons. For example, a user who is planning a trip may perform one or more maps searches in advance of the trip to obtain information about their destination (e.g., to get directions from the user's destination airport to the user's hotel, or to find restaurants near the user's hotel). To retrieve this information later during the actual trip, the user must manually return to their maps application and repeat their search, which can be cumbersome and time-consuming for the user.

In addition, tourists and other travelers are often challenged by the task of deciding what to do when visiting a city, state, country, or other area. Because number of different attractions, (including resorts, museums, parks, theaters, etc.) may be available it can be difficult to survey and select attractions during a particular visit. An entire industry has developed in response to this challenge, with a variety of sites and services soliciting lists of attractions visited and reviews thereof, and subsequently offering these lists and/or reviews to other travelers as a resource.

Many existing solutions have a number of drawbacks, however. Some solutions, for example, require that a user manually record and enter information about any attraction visited when traveling. The comprehensiveness of such information is often incomplete, however, as many users (e.g., those on vacation) may not be interested in manually recording information about their visits.

SUMMARY

Techniques of this disclosure generally involve storing a historical record of a user's maps searches (a maps history), and providing a user with relevant information about elements in their maps history based on the user's current location (based on, e.g., a current location of a computing device associated with the user). Such elements can include generic queries, specific queries, direction queries, click entries, places, and so forth. In some examples, the location of a mobile device associated with the user is provided to a server, which in turn processes the user's maps history to determine which elements from the maps history may be relevant to the mobile device's current location. Elements that are determined to be of possible relevance, and/or information relating thereto, can then be presented to the user, in many instances decreasing the time and effort required for the user to access relevant location-based information.

In one aspect, a method for generating a list of contextually-relevant elements using a computer processor is provided. The method can include receiving information indicative of a current location of a user and storing the information in a memory. The method can also include fetching a maps search history associated with the user, the maps search history comprising a plurality of elements corresponding to map-based queries executed by the user during a historical time period. The method can also include, using a processor coupled to the memory, determining whether each of the plurality of elements is relevant to the user's current location and adding elements determined to be relevant to a list of relevant elements. The method can also include storing the list of relevant elements in the memory.

The method can include associating a geographic location with each of the plurality of elements and adding an element to the list of relevant elements if the geographic location associated therewith is within a predetermined threshold distance of the user's current location.

The plurality of elements can include a directions query, and the method can include associating the directions query with a source geographic location and a destination geographic location. The plurality of elements can include a query that returns a plurality of places and the query can include one or more click entries indicating which of the plurality of places the user clicked on or otherwise selected after executing the query. The method can also include associating with the query the geographic locations of only those places that are indicated by the one or more click entries.

The method can also include de-duplicating the list of relevant elements by sending each element in the list of relevant elements to a mapping application configured to add the element to a map and discard received elements that have already been added to the map, receiving from the mapping application an extracted set of elements previously added to the map, and replacing the list of relevant elements with the extracted set of elements.

The method can also include sorting the list of relevant elements based on at least one of a proximity of a geographic location associated with each element to the user's current location, a frequency with which a query corresponding to each element was executed by the user, and a recency with which a query corresponding to each element was executed by the user. The method can also include outputting the list of relevant elements to a mobile device associated with the user and/or sending a notification to a mobile device associated with the user including information relating to an element in the list of relevant elements.

In another aspect, a system for providing a list of contextually-relevant elements is provided. The system can include a processor and a memory having instructions stored thereon for execution by the processor. The instructions can include a location receiving module that receives information indicative of a current location of a user and a database interface module that fetches a maps search history associated with the user, the maps search history comprising a plurality of elements corresponding to map-based queries executed by the user during a historical time period. The instructions can also include a maps history processing module that processes the maps search history to determine whether each of the plurality of elements is relevant to the user's current location and adds elements determined to be relevant to a list of relevant elements.

The processor can be disposed within at least one of a mobile device and a server. The maps history processing module can associate a geographic location with each of the plurality of elements and add an element to the list of relevant elements if the geographic location associated therewith is within a predetermined threshold distance of the user's current location.

The plurality of elements can include a directions query, and the maps history processing module can associate the directions query with a source geographic location and a destination geographic location. The plurality of elements can include a query that returns a plurality of places and that includes one or more click entries indicating which of the plurality of places the user clicked on or otherwise selected after executing the query. In some examples, the maps history processing module can associate the query with the geographic locations of only those places that are indicated by the one or more click entries.

The maps history processing module can de-duplicate the list of relevant elements by sending each element in the list of relevant elements to a mapping application configured to add the element to a map and discard received elements that have already been added to the map, receiving from the mapping application an extracted set of elements previously added to the map, and replacing the list of relevant elements with the extracted set of elements.

The maps processing module can sort the list of relevant elements based on at least one of a proximity of a geographic location associated with each element to the user's current location, a frequency with which a query corresponding to each element was executed by the user, and how recently a query corresponding to each element was executed by the user.

The instructions can also include an output module that outputs the list of relevant elements to a mobile device associated with the user or sends a notification to the mobile device including information relating to an element in the list of relevant elements.

In another aspect, a mobile device is provided that includes a processor and a memory having instructions stored thereon for execution by the processor. The instructions can include a location determining module that estimates a current location of the mobile device and a database interface module that fetches a maps search history associated with a user of the mobile device, the maps search history comprising a plurality of elements corresponding to map-based queries executed by the user during a historical time period. The instructions can also include a maps history processing module that processes the maps search history to determine whether each of the plurality of elements is relevant to the mobile device's current location and adds elements determined to be relevant to a list of relevant elements. The instructions can also include a display module that displays information relating to at least one element in the list of relevant elements.

In view of the above, examples described herein provide systems and methods for determining attractions based on location history data collected from one or more users traveling away from a home location within a geographic area. In general, location history data can be captured, for example, automatically using a mobile device associated with each user. Location history data can be analyzed on a per user basis to determine locations visited by the user within the geographic area. Data representing these locations can then be combined with data collected from one or more other users to develop a "heat map" of locations visited by a plurality of users that are traveling away from home within the geographic area. Local search technology can be utilized to associate popular locations visited by a large number of users with attractions that are located nearby. This association allows a list of attractions within a geographic area to be developed, and individual attractions within the area can be ranked according to the frequency of visits by traveling users.

More specifically, in a first aspect, a method for generating a list of attractions in a geographic area using a computer processor is provided, the method including collecting location history data for a plurality of users within the geographic area and storing the location history data in a datastore. The method further includes determining by a processor in communication with the datastore one or more locations visited by each of the plurality of users, where the one or more locations visited by each user is at least a distance away from a home location of the user. The method also includes determining by the processor one or more popular locations within the geographic area based on the one or more locations visited by the plurality of users, and associating by the processor the one or more popular locations with one or more attractions located near the one or more popular locations.

In another aspect, a system for generating a list of attractions in a geographic area is provided, the system including a location data receiving module that receives location history data from a mobile device, and a location data processing module. The location data processing module includes a processor and a memory having instructions stored thereon. The instructions stored on the memory can cause the processor to determine one or more locations visited by the mobile device based on received location history data from the mobile device. The instructions can also cause the processor to determine if the one or more locations visited by the mobile device are at least a distance away from a home location associated with the mobile device. Furthermore, the instructions can cause the processor to aggregate the one or more locations visited by the mobile device that are at least the distance away from the home location with one or more additional locations visited by one or more additional mobile devices that are also at least the distance away from an associated home location. With this data, the instructions can cause the processor to determine one or more popular locations based on the one or more locations visited by the mobile device and the one or more additional mobile devices, and to associate one or more attractions within the geographic area with the one or more popular locations.

In still another aspect, a method for providing suggestions of attractions within a geographic area to a user is provided, the method including aggregating locations visited by a plurality of users and storing the locations visited in a datastore, where each of the locations visited is determined to be at least a distance away from a home location associated with the user visiting the location. The method can also include determining by a processor in communication with the datastore one or more popular locations within the geographic area based on the locations visited by the plurality of users, and associating by the processor one or more attractions within the geographic area with the one or more popular locations. Finally, the method can include presenting the one or more attractions within the geographic area to the user.

In a further example aspect, a method includes aggregating, by a computing system, location history data for a plurality of mobile devices for locations within a geographic area, and determining, by the computing system, based on the location history data, one or more locations at which at least a threshold number of the plurality of mobile computing devices were present, where each of the one or more locations is at least a predetermined distance away from a home location of associated with each respective mobile device. The method also includes determining, by the computing system, based on the determined one or more locations at which each of the plurality of mobile computing devices was present, one or more popular locations within the geographic area, and associating, by the computing system, the one or more popular locations with one or more attractions located near the one or more popular locations.

In a further example aspect, a computing system includes at least one processor, and at least one module operable by the at least one processor to aggregate location history data for a plurality of mobile devices for locations within a geographic area, and determine, based on the location history data, one or more locations at which at least a threshold number of the plurality of mobile computing devices were present, where each of the one or more locations is at least a predetermined distance away from a home location of associated with each respective mobile device. The at least one module is also operable to determine, based on the determined one or more locations at which each of the plurality of mobile computing devices was present, one or more popular locations within the geographic area, and associate the one or more popular locations with one or more attractions located near the one or more popular locations.

In another example, a computer-readable storage medium stores instructions that, when executed, cause at least one processor of a computing device to aggregate location history data for a plurality of mobile devices for locations within a geographic area, and determine, based on the location history data, one or more locations at which at least a threshold number of the plurality of mobile computing devices were present, where each of the one or more locations is at least a predetermined distance away from a home location of associated with each respective mobile device, determine, based on the determined one or more locations at which each of the plurality of mobile computing devices was present, one or more popular locations within the geographic area, and associate the one or more popular locations with one or more attractions located near the one or more popular locations.

The systems and methods described above can have a number of variations and additional features. For example, in some examples, the location history data can include information representing a date, time, and geographic position. The geographic position can include, for example, a latitude and longitude coordinate position, as well as an accuracy radius. The location history data can be collected in a variety of manners. In some examples, collecting location history data for a plurality of users can include receiving location history data from a plurality of mobile devices being operated by the plurality of users (e.g., a smart phone being carried by each user).

When determining whether one or more locations visited by a user are at least a distance away from a home location associated with the user, any suitable distance can be utilized. In some examples, the distance can be about 200 miles. In other examples, however, the distance can be greater or less than about 200 miles. The distance can be selected to achieve a high probability that locations greater than the distance from a home location are likely to be visited during travel away from home (e.g., vacation, business travel, etc.).

As described in more detail below, location history data can include a large number of data points representing a series of geographic positions of a device and/or user at particular dates and times. A number of different algorithms can be applied by the systems and methods described herein to reduce location history data to one or more locations visited by the device and/or user. For example, in some examples, a clustering algorithm can be utilized to determine which data points are proximate in both space and time. Proximate location history data points can be reduced to a single location visited by, for example, determining a centroid of the proximate data points along with a period of time spent at the location. In some examples, determining one or more locations visited by each of a plurality of users can include utilizing such a clustering algorithm on the location history data collected from each user.

In some examples, a clustering algorithm can be applied one or more times to filter results and reduce signal noise when determining attractions in a geographic area. For example, a clustering algorithm can be applied to determine one or more locations visited by a user from a plurality of data points representing location history data. In addition, a clustering algorithm can also be used to determine one or more popular locations visited by a plurality of users after data representing locations visited by the plurality of users is aggregated together.

In addition to determining geographic positions of popular locations in an area, systems and methods of this disclosure can also utilize local search technology to associate an attraction with each popular location. In some examples, a local search based on the position of a popular location can be limited to one or more categories of results (e.g., attractions, parks, etc.).

The systems and methods described herein can be executed and evaluated continually or periodically. For example, in some examples, techniques of the disclosure can be configured to analyze collected location history data every evening, every week, every month, etc. Furthermore, locations and other information determined from processing location history data can be added incrementally to results previously developed using older location history data. By adding incrementally to previous results, computational resources can be conserved and results spanning various time frames can be presented.

To this end, in some examples, data representing locations visited by a plurality of users can be filtered based on the date and/or time of the visits. For example, data representing locations visited by a plurality of users can be filtered to include only visits during the summer months, or during a specific month or year. This time-period filtering can aid in producing, for example, a season-specific listing of attractions for a given area (e.g., a historic baseball stadium is likely not a popular attraction during winter in the northern United States).

In other examples, filtering can be done based on characteristics of a user. For example, a user having one or more characteristics (e.g., age, marital status, sex, interests, etc.) can be shown attractions popular with other users sharing similar characteristics (e.g., others of similar age, marital status, sex, interests, etc.). This can be done by aggregating only data from a plurality of other users that each shares the one or more characteristics in common with the user.

The details of one or more examples are set forth in the accompanying drawings and the description below. Other features, objects, and advantages of the disclosure will be apparent from the description and drawings, and from the claims.

BRIEF DESCRIPTION OF THE DRAWINGS

FIG. 8 is a table illustrating example location history data;

DETAILED DESCRIPTION

Systems and methods are disclosed herein that generally involve storing a historical record of a user's maps searches (a maps history), and providing a user with relevant information about elements in their maps history based on the location of a mobile device associated with the user. Such elements can include generic queries, specific queries, direction queries, click entries, places, and so forth. In some examples, the mobile device's location is provided to a server, which in turn processes the user's maps history to determine which elements from the maps history may be relevant to the user's current location. Elements that are determined to be of possible relevance, and/or information relating thereto, can then be presented to the user, in many instances decreasing the time and effort required for the user to locate map-based information for which they are searching.

Certain examples will now be described to provide an overall understanding of the principles of the structure, function, manufacture, and use of the systems and methods disclosed herein. One or more examples of these examples are illustrated in the accompanying drawings. Those skilled in the art will understand that the systems and methods specifically described herein and illustrated in the accompanying drawings are non-limiting examples. The features illustrated or described in connection with one example may be combined with the features of other examples. Such modifications and variations are intended to be included within the scope of the present disclosure.

In situations discussed below in which systems and devices collect or make use of personal information about the user (e.g., search histories, location, etc.) the user may be provided with an opportunity to control whether programs or features of the systems and devices can collect user information (e.g., information about a user's e-mail, a user's social network, social actions or activities, profession, a user's preferences, user's Internet search history, a user's current location, etc.), or to control whether and/or how to the systems and devices may receive content that may be relevant to the user. In addition, certain data may be treated in one or more ways before it is stored or used by the systems and devices, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the systems and devices described herein.

Figure 1:
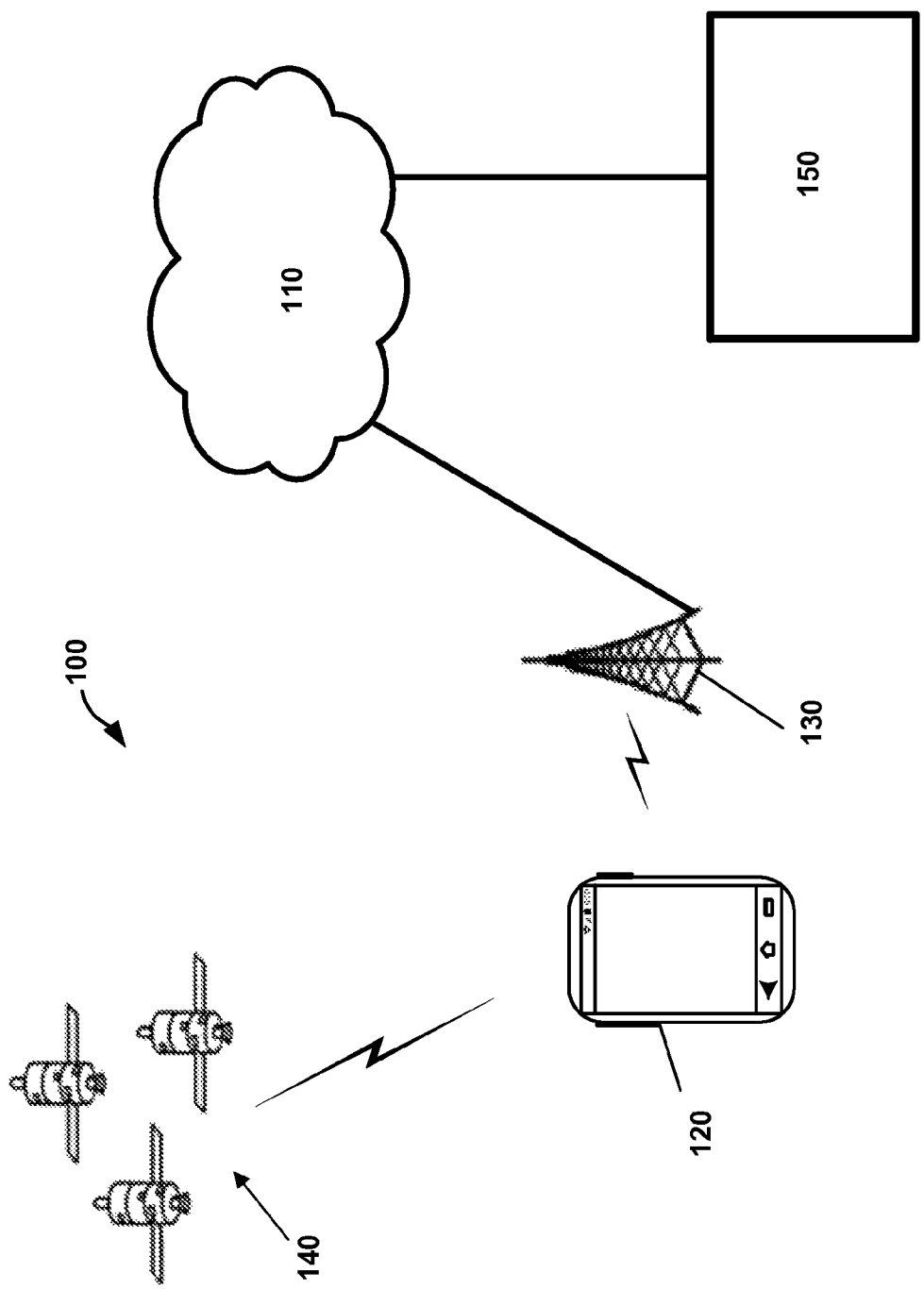
FIG. 1 is a schematic diagram of one example of a mobile network.

FIG. 1 illustrates an example of a mobile network 100 in which one or more of the techniques disclosed herein can be implemented. The mobile network 100 includes a communications network 110 and a mobile device 120. The mobile device 120 can connect to the communications network 110 via various access points 130. Although one mobile device 120 and one access point 130 are illustrated for brevity, the mobile network 100 can include any number of mobile devices and access points.

The mobile device 120 can be or can include any device that is configured to exchange data over the communications network 110, such as a mobile phone, tablet computer, laptop computer, and so forth. The mobile device 120 can also be or can include devices that are not necessarily "mobile," such as desktop computers. The communications network 110 can include any of a variety of networks or combinations of networks, such as GSM, TDMA, CDMA, IEEE 802.11, Bluetooth, Wi-Fi, or any other wired or wireless networks. The access points 130 can be transceivers that provide a gateway between the mobile device 120 and the communications network 110. For example, the access points 130 can be wireless routers or cellular network towers. In some examples, the mobile device 120 can also receive Global Positioning System (GPS) signals transmitted from GPS satellites 140.

In the illustrated example, the mobile network 100 also includes a maps server 150 that can exchange data with the mobile device 120 via the communications network 110. The maps server 150 can be implemented on one or more computer systems (e.g., server computers, personal computers, workstations, mini-computers, clustered computer systems, or embedded computer systems). Some or all of the maps server 150 functionality can also be implemented on the mobile device 120 itself.

As used throughout this disclosure, the phrase "current location" refers to a location at a particular time. In various instances, mobile device 120 may have physically moved to a different geographic location between the time at which the current location was first determined and the present moment. Even so, the "current location" of mobile device 120 is determined to be the location at which the device was physically located at the moment that the location was last determined. The same "current location" may be used throughout the prediction process even though updated current locations may be determined during the prediction process. In general, a "current location" of mobile device 120 may be any location within a threshold distance surrounding the determined current location. Similarly, the phrase "current time" refers to a particular time at which mobile device 120 determined the "current time" and may be the same time used throughout the prediction process even though the literal current time may change by fractions of a second, a second, or some other amount during the prediction process.

Figure 2:
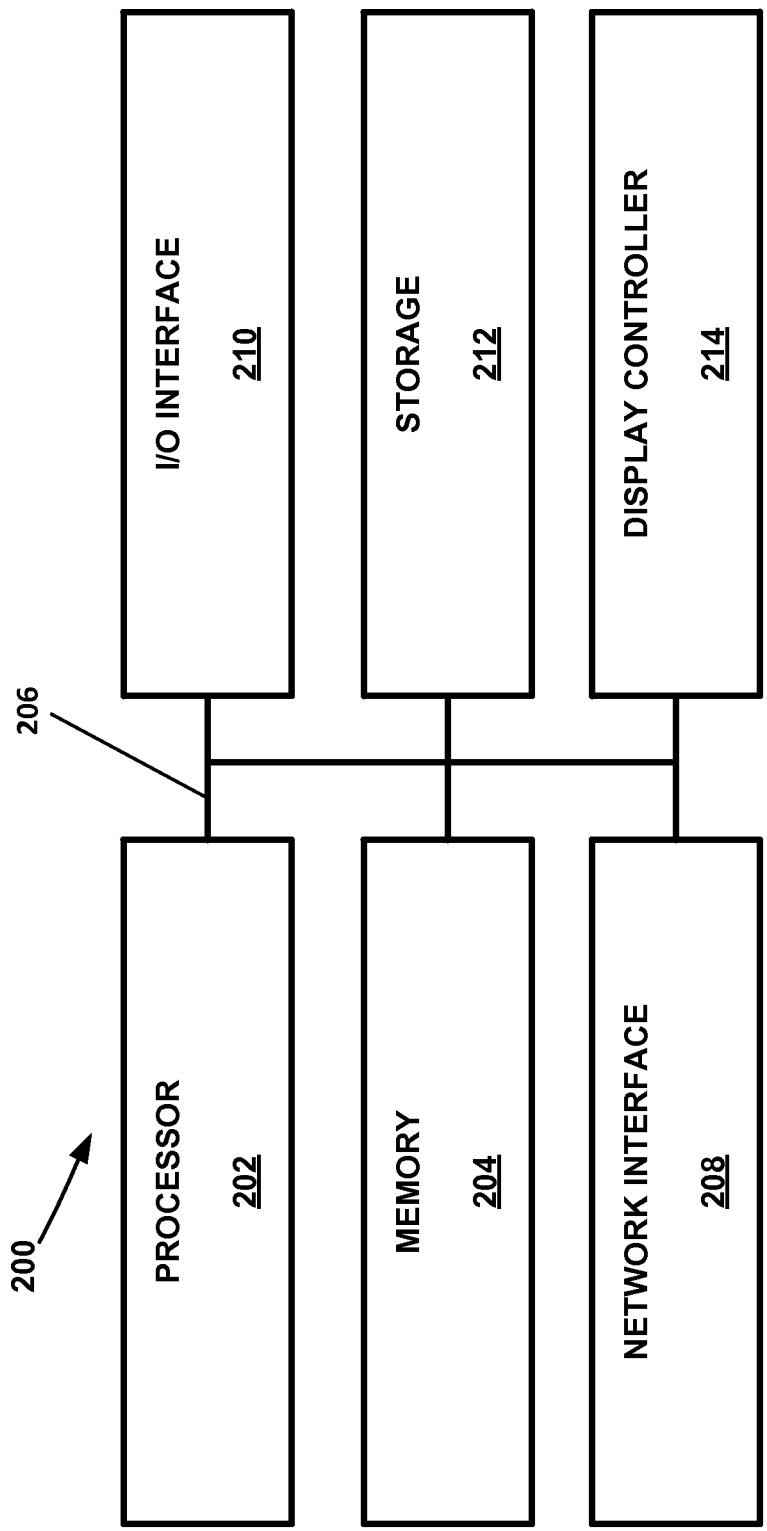
FIG. 2 is a schematic diagram of one example of a computer system.

FIG. 2 illustrates an example architecture of a computer system 200 which can be used to implement the mobile device 120 or the maps server 150 of FIG. 1. Although an example computer system 200 is depicted and described herein, it will be appreciated that this is for sake of generality and convenience. In other examples, the computer system may differ in architecture and operation from that shown and described here.

The illustrated computer system 200 includes a processor 202 which controls the operation of the computer system 200, for example by executing an operating system (OS), device drivers, application programs, and so forth. The processor 202 can include any type of microprocessor or central processing unit (CPU), including programmable general-purpose or special-purpose microprocessors and/or any of a variety of proprietary or commercially-available single or multi-processor systems. The computer system 200 also includes a memory 204, which provides temporary or permanent storage for code to be executed by the processor 202 or for data that is processed by the processor 202. The memory 204 can include read-only memory (ROM), flash memory, one or more varieties of random access memory (RAM), and/or a combination of memory technologies. The various elements of the computer system 200 are coupled to a bus system 206. The illustrated bus system 206 is an abstraction that represents any one or more separate physical busses, communication lines/interfaces, and/or multi-drop or point-to-point connections, connected by appropriate bridges, adapters, and/or controllers.

The computer system 200 also includes a network interface 208, an input/output (I/O) interface 210, a storage device 212, and a display controller 214. The network interface 208 enables the computer system 200 to communicate with remote devices (e.g., other computer systems) over a network. The I/O interface 210 facilitates communication between one or more input devices, one or more output devices, and the various other components of the computer system 200. The storage device 212 can include any conventional medium for storing data in a non-volatile and/or non-transient manner. The storage device 212 can thus hold data and/or instructions in a persistent state (i.e., the value is retained despite interruption of power to the computer system 200). The storage device 212 can include one or more hard disk drives, flash drives, USB drives, optical drives, various media disks or cards, and/or any combination thereof and can be directly connected to the other components of the computer system 200 or remotely connected thereto, such as over a network. The display controller 214 includes a video processor and a video memory, and generates images to be displayed on one or more displays in accordance with instructions received from the processor 202.

The various functions performed by the maps server 150 or the mobile device 120 can be logically described as being performed by one or more modules. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules can be stored as an executable program on one or more non-transitory computer-readable storage mediums. Functions disclosed herein as being performed by a particular module can also be performed by any other module or combination of modules, and the maps server 150 or the mobile device 120 can include fewer or more modules than what is shown and described herein.

Figure 3:
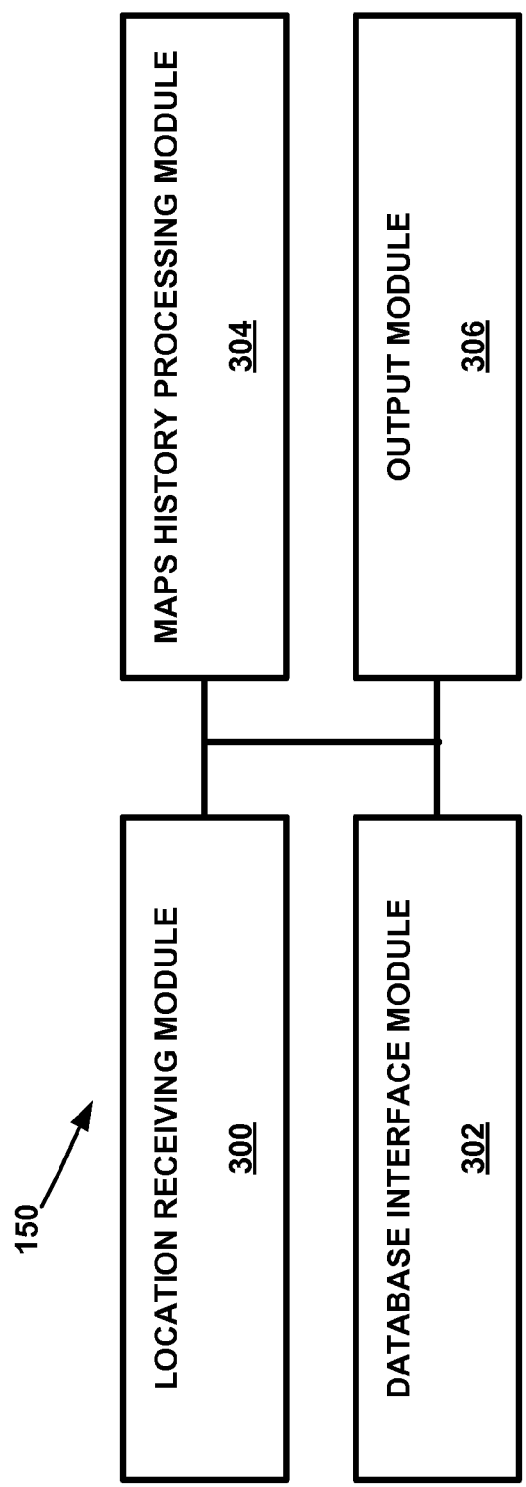
FIG. 3 is a schematic diagram of one example of a maps server.

FIG. 3 is a schematic diagram of the modules of one example of the maps server 150. As shown in FIG. 3, the maps server 150 can include a location receiving module 300 configured to receive location data. For users who opt in, and in accordance with published privacy policies, the location data can be indicative of the current location of the user.

In some instances, the current location of a user can be inferred from the current location of a mobile device or other object in the user's possession. In the example of FIG. 1, the mobile device 120 can be configured to periodically communicate its current location to the location receiving module 300 using the mobile network 100. This can occur several times per minute, once per minute, once per hour, or at any other regular or sporadic time interval. The mobile device 120 can determine or estimate its current location using any of a variety of known techniques, such as by processing GPS signals, by detecting proximity to cell towers, Wi-Fi hot spots, or other mobile access points 130 of known location, or by triangulating between the mobile device 120 and a plurality of such access points 130. One example of a computer program for obtaining a user's current location is a geolocation API. This program provides the best estimate of a mobile device's location using a number of onboard or server-based sources (called location providers).

The location receiving module 300 can also receive the mobile device's current location and/or the location of the user from other sources, such as when a user "checks in" at a location using any of a number of social applications that provide for such check-ins, when the user indicates their current position by dropping a pin at a particular location or making an equivalent selection using mapping software, or when the user responds to a prompt for their current position. It will be appreciated that the location data received by the location receiving module 300 need not necessarily be indicative of the mobile device's current location. Rather, the user can also provide some other location, such as a location that the user has visited in the past or plans to visit in the future, in order to obtain maps history information relevant to that location.

The location data received by the location receiving module 300 can be arranged in a format that includes a longitude, a latitude, and an accuracy radius. The accuracy radius can represent an estimate of the accuracy of the current location data. The accuracy radius can range from meters to kilometers depending on the source of the location data. For example, location data derived from GPS signals can have an accuracy radius of several meters while location data derived from triangulation of cell towers can have an accuracy radius of several kilometers. The location receiving module 300 can also receive raw proximity or other data from the mobile device 120 and can perform any necessary triangulation or location calculations on the server side.

The maps server 150 can also include a database interface module 302 which can be configured to communicate with a database in which the user's maps history is stored. The database can be stored on the mobile device 120, on the maps server 150, and/or in other locations, such as a cloud-based repository. For users who opt in, and in accordance with published privacy policies, the database can be updated each time the user initiates a maps search to store the search query entered by the user as an element in the user's maps history. The database can store the user's maps searches, only maps searches that occurred during a predetermined time period (e.g., the last 24 hours, the last 7 days, the last 30 days, the last year, or since the user last cleared their maps history), or any other subset of the user's maps searches. A maps search can be associated with a particular user, and thereby added to the user's maps history, if it is executed on a device associated with the user, or if the user identifies themselves at the time of initiating the maps search (e.g., by supplying a username and password or other login credentials). Accordingly, a user's maps history can include elements from a plurality of devices (e.g., searches conducted by the user on their desktop computer as well as searches conducted by the user on their phone). The database interface module 302 can execute various operations with respect to the maps history database, such as reading information from the database, writing information to the database, or querying the database.

The maps server 150 can also include a maps history processing module 304. The maps history processing module 304 can instruct the database interface module 302 to retrieve the user's maps history from the maps history database. The maps history processing module 304 can then process the elements of the user's maps history to determine which elements are relevant to the location data received by the location receiving module 300 and to generate a list of said elements, as described below.

The maps server 150 can also include an output module 306 configured to output a list of relevant elements from the maps history, or to output information about one or more of the relevant elements. The list or other information can be sent as a data transmission via the mobile network 100 to the mobile device 120, which can in turn be configured to display or otherwise present the list or other information to the user. The presentation to the user can be in a standalone application, or in the mobile device's native mapping software, e.g., upon actuating a button or other user interface element.

In situations herein in which the location receiving module 300 collects or makes use of personal information about the user (e.g., search histories, location, etc.), the user may be provided with an opportunity to control whether location receiving module 300 can collect user information or to control whether and/or how location receiving module 300 may receive content that may be relevant to the user. In addition, location receiving module 300 may treat certain data in one or more ways before it is stored or used by location receiving module 300 so that personally identifiable information is removed. Thus, the user may have control over how information (e.g., data) is collected about the user and used by location receiving module 300 as described herein.

Figure 4:
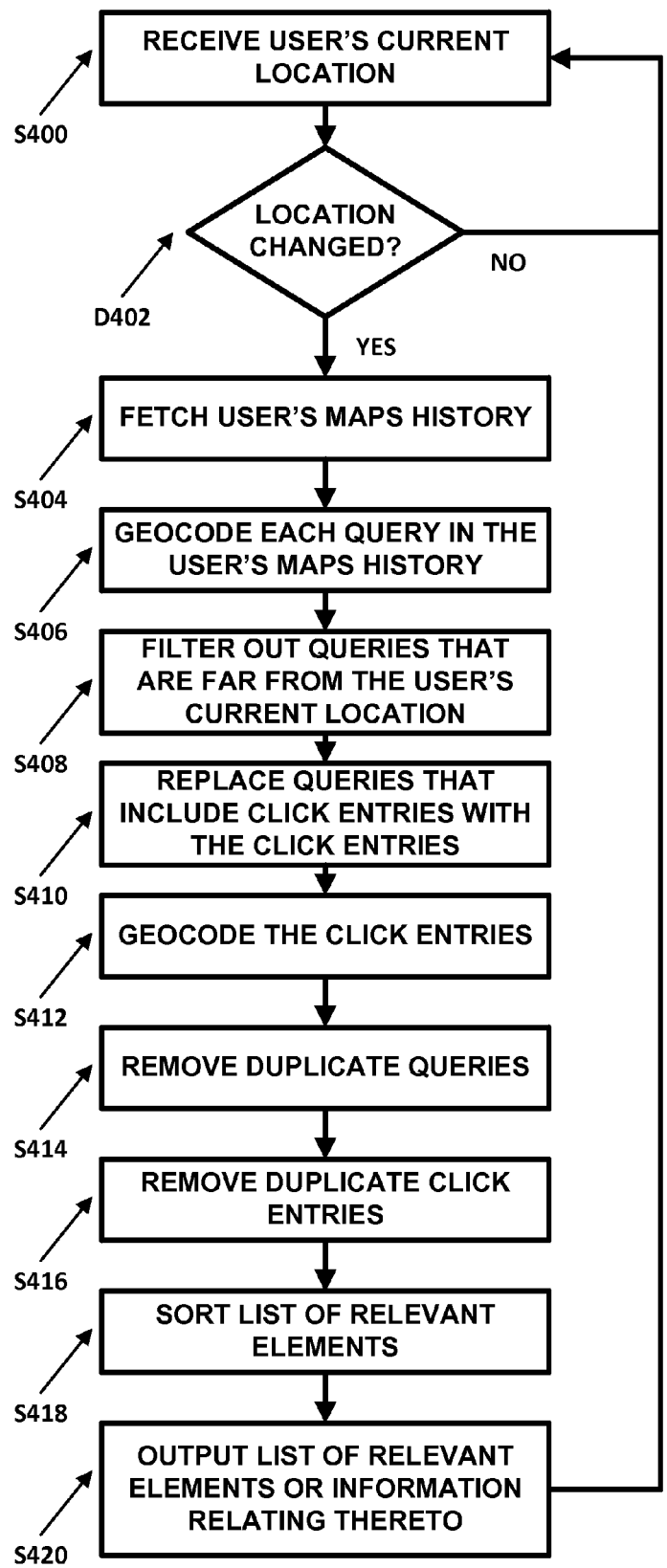
FIG. 4 is a flowchart that schematically depicts an example process for providing information about relevant elements from a user's maps history to the user based on a mobile device's location.

FIG. 4 is a flowchart illustrating an example process for providing information about relevant elements from a user's maps history based on the mobile device's location. While various aspects disclosed herein may be shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowchart(s) are merely examples, various other methods that include additional steps or include fewer steps than illustrated are also within the scope of the present disclosure.

The illustrated method, which in some examples can be executed by the maps server 150, begins at step S400 where a user's current location, or another location specified by the user, is received.

The method continues at decision block D402, where it is determined whether the user's current location has changed since the last time the method was executed. If no change is detected ("NO" in decision block D402), execution returns to step S400 and the process repeats. The decision as to whether a change in location has occurred can be made based on the degree to a which a mobile device's location has changed, such that movement of the user a short distance is not flagged as a location change, and only changes in location that exceed a predetermined distance threshold (e.g., 1 mile, 10 miles, 100 miles, etc.) are flagged.

When a change in location is detected, e.g., when the user arrives at an out of town airport ("YES" in decision block D402), execution proceeds to step S404. In step S404, the database interface module 302 of the maps server 150 can fetch the user's maps history from a database. In some examples, queries as entered by the user in a mapping application can be stored as elements in the maps history. Such queries can include generic queries (e.g., "pizza Mountain View, Calif."), specific queries (e.g., "1234 Pleasant Parkway, Mountain View, Calif."), directions queries (e.g., "SFO airport to 1234 Pleasant Parkway, Mountain View, Calif."), and so forth. One or more click entries can also be stored in the maps history in association with a query, indicating places returned by the query that the user clicked on or otherwise selected. Click entries can be stored in the maps history by their cluster identifier ("CID"). A CID is unique identifier assigned by a mapping application to each place in the universe of places that can possibly be returned by querying the mapping application. For example, each place listed in a local index used by a maps software can be assigned a unique CID.

In step S406, the maps history processing module 304 of the maps server 150 can associate each query from the user's maps history with a geographic location. For example, processes known as geocoding and reverse geocoding can be used to convert queries in the maps history into geographic coordinates and vice versa. Geocoding refers to a process in which a query (e.g., a human-readable address such as "1234 Pleasant Parkway, Mountain View, Calif.") can be converted to location data in geographic coordinates (e.g., latitude 37.423021 and longitude −122.083739). Reverse geocoding refers to the reverse process, i.e., converting geographic coordinates into an address, place, etc. One example of a computer program for geocoding and reverse geocoding is a geocoding API. This program can accept geographic coordinates and return a corresponding place or address, and vice versa. Generic queries (e.g., "pizza Mountain View, Calif.") can be associated with the geographic location of the first search result returned by the query, or with the geographic center of a city or town specified in the query (Mountain View, Calif. in this example). Specific queries (e.g., "1234 Pleasant Parkway, Mountain View, Calif.") can be associated with their corresponding geographic location (latitude 37.423021 and longitude −122.083739 in this example).

The geographic location data associated with each query from the user's maps history can be specified as a latitude-longitude pair, as a latitude-longitude pair with an accuracy radius, or in some other format. Geographic location data generated for each query from the user's maps history can be stored by the maps server 150.

Execution then proceeds to step S408, in which the maps history processing module 304 can filter out queries that are far from the user's current location. For example, the geographic location data generated for each query in step S406 can be compared to a geographic location corresponding to the user's current location, or some other location specified by the user, to assess their proximity. Queries that are associated only with places that are more than a predetermined threshold distance from the user's current location (e.g., 10 meters, 100 meters, 1 kilometer, 1 mile, 10 miles, 100 miles, etc.), after taking into account any associated accuracy radii, can be discarded and the remaining queries can be added to a list of relevant elements for subsequent processing. The predetermined threshold distance can be fixed or can vary depending on any of a number of factors, such as the quantity of queries in the user's maps history. In some examples, the predetermined threshold distance can be selected so as to obtain at least a minimum number of elements and less than a maximum number of elements in the list.

In step S410, the maps history processing module 304 can determine whether each query includes one or more click entries. As noted above, a click entry can be stored in the user's maps history in association with a query when the query is executed and the user clicks on or otherwise selects one or more of the query results. For example, a user might execute a maps query for restaurants near a particular hotel that returns several places. If the user clicks on two of the places, click entries corresponding to the places the user clicked on can be stored in the user's maps history in association with the initial query. If it is detected in step S410 that a query includes one or more associated click entries, the query can be replaced in the list of elements with the click entries. Thus, in the example above, the query "restaurants near hotel A" can be replaced with click entries "restaurant B" and "restaurant C" (corresponding to the two restaurants that the user had previously clicked on).

In step S412, any click entries added to the list of elements can be geocoded to produce corresponding location data (e.g., a latitude-longitude pair or a latitude-longitude pair with an associated accuracy radius). For example, the CID associated with each click entry can be geocoded. It can be more computationally efficient to geocode the click entries in a separate step, after discarding queries that are distant from the users current location, as is done in the illustrated example. This way, queries that are distant from the user's current location only trigger one geocode operation. If the click entries were geocoded before discarding queries (e.g., in step S406), queries that are distant from the user's current location would instead trigger N geocode operations (N being equal to the number of click entries associated with the query).

The maps history processing module 304 can be further configured to de-duplicate the query list. De-duplication can be performed to handle instances in which more than one element in the list corresponds to the same place. This can occur when a user searches for the same place in different ways, for example by searching for their hotel by address and then searching for their hotel by name. By way of further example, a user's maps history might include queries such as "pizza mountain view, Calif.", "pizza, mountain view", "pizza mtn view", and "pizzza mountain view" which all correspond to the same place.

In step S414, the maps history processing module 304 can remove any duplicate queries from the element list. For each query in the list, the maps history processing module 304 can determine if the query is a "directions query" (e.g., a query that indicates the user sought directions from a source location to a destination location). If the query is a directions query, it can be replaced with a unique key that combines the latitude-longitude coordinates of the source with the latitude-longitude coordinates of the destination. The key can also include one or more accuracy radii associated with the source and/or the destination. If the query is not a directions query, it can be seen as only having a destination, and therefore can be replaced with a unique key that includes the latitude-longitude coordinates of the destination and any associated accuracy radius.

The generated keys can then be de-duplicated using any of a variety of techniques. In some examples, a mapping application can be used to perform the de-duplicating. The mapping application can be configured to receive one or more keys and to plot the keys in a map. When the mapping application receives a new key, it can check to see if an identical key has already been mapped. If so, the new key can be discarded. The mapping application can also be configured to respond to an "extract" command by sending a list of keys that were previously added to the map to the issuer of the command. Thus, the maps history processing module 304 can de-duplicate the list of elements by sending each key in the list to the mapping application, which can in turn discard any duplicate keys. The maps history processing module 304 can then issue an extract command to the mapping application and receive an extracted set of keys from the mapping application that does not include any duplicates. The list of elements can then be replaced with the extracted set of keys. Using the mapping application to de-duplicate the keys can be more computationally-efficient than other techniques, as it can require only a single linear pass through the list of elements. In other examples, the list can be de-duplicated using more computationally-intensive techniques, such as sorting the list and iteratively comparing adjacent keys to identify duplicates.

In step S416, the maps history processing module 304 can remove any duplicate click entries from the list of elements. The maps history processing module 304 can replace each click entry in the list with a unique key that includes the latitude-longitude coordinates of the click entry or the click entry's CID. The generated keys can then be de-duplicated, for example using any of the techniques described above.

After removing duplicate queries in step S414 and removing duplicate click entries in step S416, the remaining keys in the list of elements can be sorted in step S418. Any of a variety of methods can be used to sort the list. In some examples, the user's maps history can include timestamps for each element (e.g., the time the user initiated a query or the time that a user clicked on a click entry). Accordingly, the list can be sorted in descending timestamp order, such that more-recent elements are listed first. The list can also be sorted based on how frequently the elements appear in the user's maps history. This way, queries or click entries which were executed or clicked more often by the user are listed ahead of queries or click entries which were executed or clicked less often. The list can also be sorted based on the proximity of each element to the user's current location.

In step S420, the sorted list can be output by the output module 306 for presentation to a user. In particular, the outputted list can be transmitted to the user's mobile device 120 for presentation to the user. The user can then select a query from the list to re-run the query, or can select a click entry from the list to obtain information regarding the place to which the click entry corresponds. The output module can also output information about one or more elements in the list of elements, e.g., as a text message, email, or other notification sent to the user's mobile device. Such information can include directions from the user's current location to a location associated with an element in the list, traffic status on the route from the user's current location to a location associated with an element in the list, and so forth. An example notification might say "welcome to [user's current location], would you like directions to [one of the list elements]?" Another example notification can be "traffic from here to [one of the list elements] appears to be heavier than normal." Execution can then return to step S400 and the process repeats.

Accordingly, using the illustrated method, a list of relevant elements from a user's maps history can be presented to the user based on the user's current location, such that the user can quickly and easily retrieve map-based information for which they are searching. The list of relevant elements can also be used to generate contextually-relevant user notifications or alerts.

Figure 5:
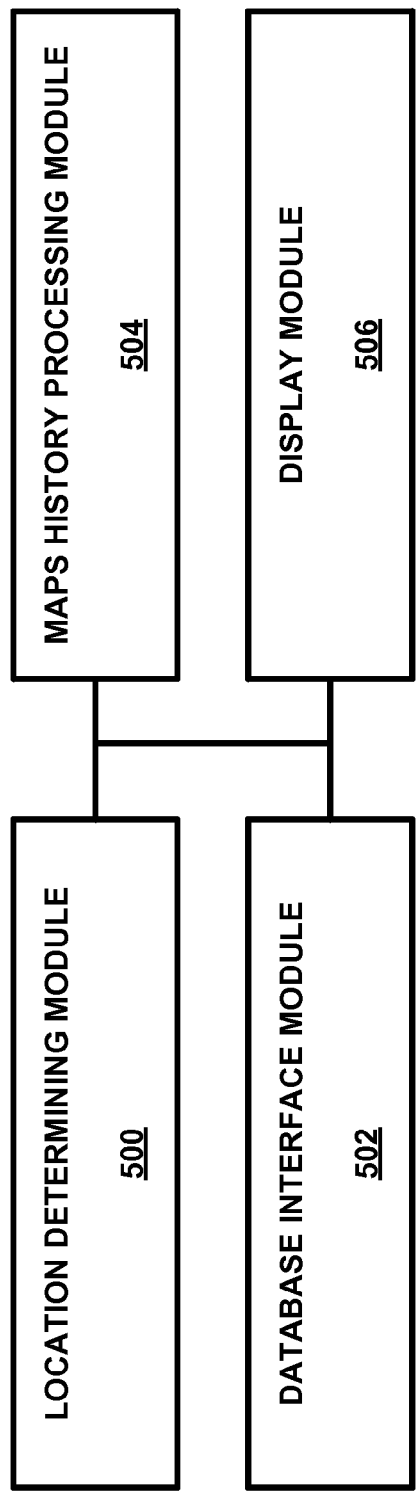
FIG. 5 is a schematic diagram of one example of a mobile device.

In some examples, some or all of the functionality disclosed above as being performed by the maps server 150 can instead be performed by the mobile device 120. FIG. 5 is a schematic diagram of the modules of a mobile device in one example. The structure and function of the mobile device illustrated in FIG. 5 is substantially similar to that of the maps server of FIG. 3, except as noted herein and as will be readily apparent to those having ordinary skill in the art. Accordingly, a detailed description thereof is omitted here for the sake of brevity.

As shown in FIG. 5, the mobile device can include a location determining module 500 configured to estimate the current location of the mobile device, for example using GPS or access point triangulation. The mobile device can also include a display module 506 configured to display a generated list of relevant elements from the user's maps history, or information relating thereto, for example on a display screen of the mobile device. The other illustrated modules can function in the same manner as those disclosed above with respect to the maps server 150, except that data stored or produced by a remote server (e.g., maps history databases) can be accessed by those modules using one or more calls to the remote server, for example using the mobile network 100.

The techniques of this disclosure can also provide the ability to determine one or more attractions within a geographic area using location history data for one or more users traveling within the area. In examples, location history data can be collected for a plurality of users where each user is traveling at least a distance away from a home location associated with the user. The location history data for the plurality of users can be analyzed and aggregated to determine the most popular locations within the geographic area that are visited frequently by the plurality of users. Local search technology can be used to associate the popular locations with attractions at or near the locations, and the resulting listing of attractions can be utilized in suggesting attractions to other users travelling within, or planning to travel to, the geographic area.

Certain examples will now be described to provide an overall understanding of the principles of the structure, function, manufacture, and use of the systems and methods disclosed herein.

A user's location can be inferred based on the location of the user's mobile device. Location information can be stored at various time intervals to provide a location history of the device and the user. An application for determining and recording location information using a user's mobile device can be used. For users who opt in, and in accordance with published privacy policies, such an application can determine and store the location of a user's mobile device to create a location history. This location history can be stored in a cache or other memory on the mobile device, or it can be transmitted to a server over a mobile network and stored in a datastore.

Figure 6:
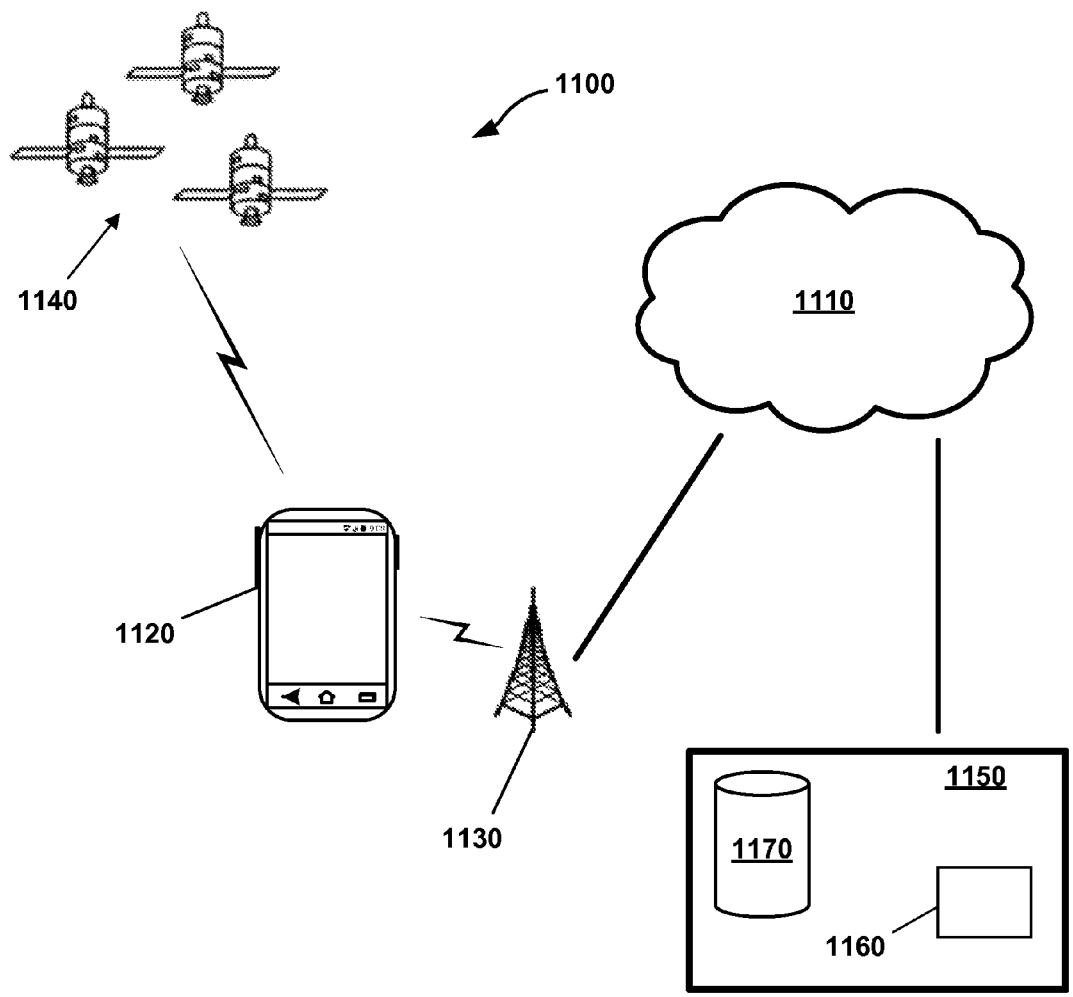
FIG. 6 schematically illustrates an example mobile network according to aspects of the invention.

FIG. 6 illustrates an example of a mobile network 1100 for providing location-based services. In the illustrated example, the mobile network 1100 includes a communications network 1110 and a mobile device 1120. The mobile device 1120 can connect to the communications network 1110 via various access points 1130. Although one mobile device 1120 and one access point 1130 is illustrated for purposes of example, the mobile network can include any number of mobile devices and access points.

The mobile device 1120 can be any device that is configured to exchange data over a mobile network. For example, the mobile network 1100 can be a GSM, TDMA, or CDMA technology enabled network, or any other form of wireless network, e.g., IEEE 802.11, Bluetooth, or other Wi-Fi network, or a combination of wired and wireless networks. The access points 1130 can be a form of radio receiver or transmitter that provides a gateway between the mobile device 1120 and the communications network 1110. For example, the access points can be wireless routers or cellular network towers. In some examples, the mobile device 1120 can also receive GPS signals transmitted from GPS satellites 1140.

In the illustrated example, the mobile network 1100 also includes a location server 1150 that can exchange data with the mobile device 1120 via the communications network 1110. The location server 1150 can include, for example, a digital data processor 1160 in communications coupling with a digital datastore 1170.

The location server 1150 can be implemented on one or more computing devices. Such computing devices may include, but are not limited to, one or more personal computers, workstations, mini-computers, clustered computer systems, and/or embedded systems. Some or all of the location server 1150 functionality could also be implemented on the mobile device 1120 itself. Such computing devices may also include, but are not limited to, a device having one or more processors and memory for executing and storing instructions. Such a computing device may include software, firmware, and hardware. Software may include one or more applications and an operating system. Hardware can include, but is not limited to, a processor, memory and graphical user interface display. The location server 1150 may be implemented using hardware, software or a combination thereof and may be implemented in a computer system or other processing system.

Figure 7:
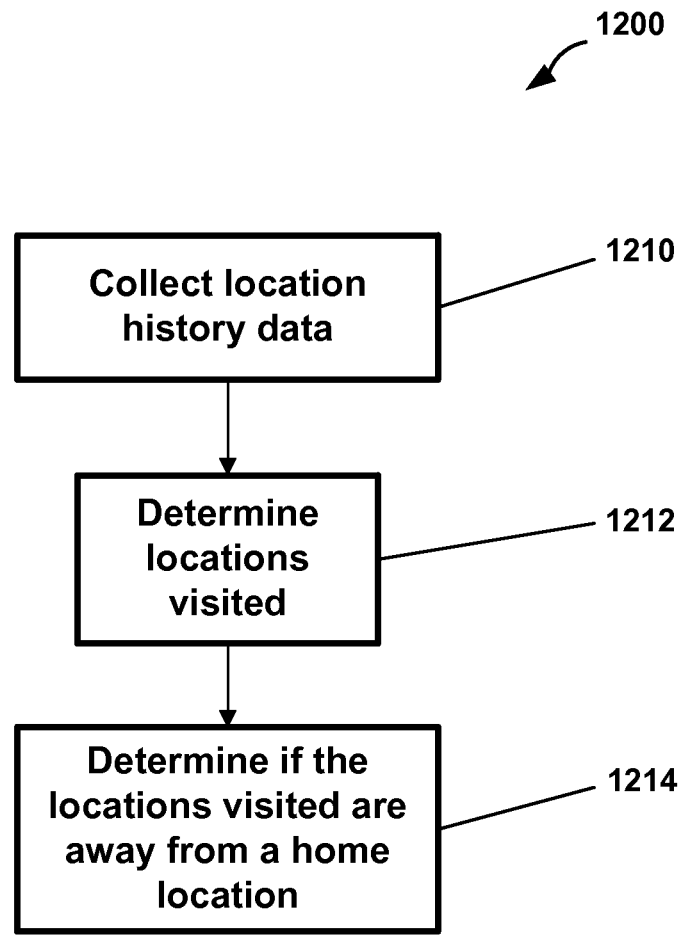
FIG. 7 is a flowchart of an example method for collecting and analyzing location history data for a user within a geographic area.

FIG. 7 is a flowchart illustrating an example process 1200 for collecting location information and determining locations visited by a user. The method may include obtaining location history data, or it might include operating on pre-existing location history data. As shown in FIG. 7, the process 1200 begins at step 1210 where location history data is collected. For example, the location history data can be generated by a mobile device, such as the mobile device 1120 of FIG. 6, and communicated to the location server 1150 over the mobile network 1100 via access points 1130 and communications network 1110. Location history data can also be collected by location server 1150, such as when a user "checks in" at a location using any number of social applications that provide for such check-ins.

The location history data can be acquired by the mobile device using any of several technologies for determining position. For example, the location data can be acquired by the mobile device using a GPS receiver. The Global Positioning System (GPS) is a space-based satellite navigation system that provides location and time information anywhere on or near the Earth where there is an unobstructed line of sight to four or more GPS satellites. The system is freely accessible by anyone with a GPS receiver, and many smart phones and other mobile devices include GPS receivers. The location data can also be determined using other techniques, such as proximity to cell towers (or other mobile network access points) of known location, or triangulating between the mobile device and a plurality of such towers.

In some examples, location history data can be acquired by the mobile device and stored locally in a memory on the device. The location history data can, in some examples, be processed on the mobile device using a processor on the device. In other examples, the location history data can be communicated to the location server for processing. For example, location history data can be acquired and transmitted directly to the location server. In some examples, location history data can be stored on the mobile device and transmitted to the location server at predetermined intervals. For example, location history data acquired during a time period, e.g., a day, week, month, etc., can be stored on the mobile device, and transmitted to the location server at the end of that time period. In some examples, the location history data can be acquired and stored on the mobile device until certain conditions are met, e.g., access to a wireless network, and then communicated to the location server. In some examples, the location history data can be stored on the location server, e.g., in digital datastore 1170 of FIG. 6, until data covering a plurality of days has been received. The location history data can include both historical location data as well as current location data.

Location history data can be acquired by the mobile device at various intervals. In one example, location history data can be acquired by the mobile device at regular intervals during each day. For example, location history data can be acquired several times per minute, once per minute, once per hour, once every two hours, or at any other time interval. For building a location history that is more useful with the methods described herein, more frequent location sampling can be better than employing long intervals between location data acquisitions.

Location history data can be expressed in a variety of manners. As shown in FIG. 8, location history data can take the form of information representing a geographic position and point in time, e.g., a latitude 1310, longitude 1312, date 1314, and time 1316. Location history data can also include an accuracy radius 1318 that represents an estimate of the accuracy of that location data point. The accuracy radius can range from meters to kilometers, depending on the type of location data. For example, GPS location data can have an accuracy radius of several meters while cellular network tower location data can have an accuracy radius of several kilometers.

The location history data can be processed to reduce the plurality of data points to a listing of locations visited by a user, as shown by step 1212 in FIG. 7. In some examples, the location history data can be processed by the location server 1150. The location server 1150 can process and analyze the location history data in FIG. 8 can be processed to generate "visited place" geographic data. For example, location history data can be processed to relate the raw location history data to a visited location by calculating a centroid for a cluster of nearby location history data points. A cluster of location history data points can be defined as a set of location history data points that are physically close to one another and a centroid can be defined as the geographic center of a cluster of such data points. This can be referred to as distance-based clustering. In addition, dates and times can be used to further filter the location history data and produce clusters of data points that are proximate in both space and time.

For example, for a plurality of data points gathered during a period when a user is expected to be at home, e.g., during the night, there may be data points that correspond to different locations within the user's house, e.g., the kitchen, bedroom, living room, etc. The location history data for this period may show small variations in latitude and longitude, but would relate to a single place—the home. Accordingly, such points that are close in geography over time can be treated as a cluster that represents a single place. This type of small variation in position over time can be observed when a user visits a variety of locations, including museums, parks, restaurants, theaters, resorts, etc. Clustering by determining a centroid among slightly varying positions can provide a single geographic position to represent the location visited, and can be associated with a time span spent there (e.g., the time spanned from the first to the last location history data point in the cluster). In addition, clustering can aid in reducing variability in the location history data caused by inaccuracies in the location data collection (e.g., errors in position acquisition from GPS or other sources).

In addition to determining a centroid as a single geographic position representing a location visited, other processing might include reverse geocode lookups to obtain information about the location, such as an address or a business name. Such information can be stored with the location history data. Alternatively, these processes can be used to reverse geocode the raw location history data data points and thereby form clusters—for example, by clustering location history data points that relate to a single address. This can be referred to as address-based clustering.

The data represented by the clustering processes discussed above can take the form of a longitude, latitude, start time, and end time, where the longitude and the latitude are for the centroid and the start and end times represent the time span over which the user was present in a particular place. The clustered location history data may also include a radius that can reflect inaccuracies in the location measurement, movement of the person within the cluster, or both. In addition, the data can reflect multiple visits to the same place within a user's location history data. In such an example, the data can include a vector of visit times, with each visit time including a start time and end time pair.

The method step 1212 of determining locations visited by a user can also include conducting a local search using a geographic location from a user's location history data, such as a centroid calculated from the raw location history data points. In one example, a geographic location can include at least a position and a time. In some examples, the geographic location can also include a radius, or distance from the position. This radius can be derived from accuracy information relating to the method of acquiring the geographic location, or it could be based upon variation in position within a cluster. Alternatively, a preselected value for the radius can be used. The purpose of conducting a local search is to return destinations or attractions that are proximate to the geographic location. In general, destinations and attractions are businesses, addresses, or other mappable features that can represent places that might have been visited by the user.

The local search can be conducted on a local search engine. Local search engines are search engines that attempt to return business listings and/or relevant web pages within a specific geographic area. For a local search, a user may enter a search query and specify a geographic area near which the search query is to be performed. The local search engine can return to the user relevant results, such as listings of businesses in the geographic area and/or relevant web pages pertaining to the geographic area.

In one example, the local search can be conducted by making a call to a local search engine with the geographic location from the user's location history data and a radius in which the search is to be performed. For example, the local search might be conducted for a latitude and longitude, along with a radius, such as, for example, 200 meters. The latitude and longitude are generally a point or the centroid of a cluster from the user's location history data. The radius may be calculated as described above, or it might be preselected, such as 200 meters. The 200 meter radius can be helpful if the expected accuracy in the location history data is on the order of 100 meters. In this way, one can be confident that the user's actual destination is within the area searched as part of the local search. In addition, the local search might include a limit N on the number of destinations from the area that are returned. For example, specifying N=10 might limit the number of results from within the 200 meter radius to 10.

In general, the local search can return the names of destinations within the radius. The local search might also return the distance between the destination or attraction and the geographic location (or otherwise specify its relative position with respect to the geographic location). The local search might also return a category for each destination located. For example, a restaurant might return a category of "food," while a theater might return a category of "theater" or "arts."

In some examples, users can be presented with results from the local search and given the opportunity to select the correct attraction visited. For example, a user can be asked to select one of a plurality of possible attractions returned from a local search. Alternatively, the user can be prompted to enter the name of the attraction visited using a free-form text box. User entry is not required but can increase the accuracy of the local search results. This information can be included in visited location information stored for the user.

The methods and systems of the present disclosure provide the ability to determine one or more attractions in a geographic area. As a result, when analyzing location history data for one or more users to determine popular locations within a geographic area, it can be helpful to exclude users living within the geographic area. Excluding these users can be helpful because their daily activities (e.g., going to work, home, grocery stores, etc.) can introduce unwanted noise into the data. For example, in an example defining a geographic area as a city, including visited location information for residents of the city in determining popular visited locations may introduce large office buildings, apartment complexes, or housing developments into a result set because a large number of residents of the city spend a great deal of time in these locations. However, these are not commonly considered attractions or destinations in a city. Rather, it would be better to produce a listing of destinations or attractions such as parks, museums, theaters, restaurants, etc. in a given city that are frequently visited by users traveling to the city from out of town.

Accordingly, the process 1200 can include the step 1214 of determining if the locations visited by a user are at least a distance away from a home location associated with the user. This determination can be made by calculating a distance between a geographic position of a location visited (e.g., a position of a centroid, an address reverse geocoded from such a position, etc.) and a geographic position of an associated home location. The home location associated with a user can be preset by the user, or can be determined based on analysis of location history data associated with the user. Any desired distance value can be used in this determination, but the value should preferably be large enough to exclude the daily travels of most users living within a geographic area. For example, setting the distance value below about 10 miles would likely continue to include the daily commuting activities of residents living within a geographic area. By setting the distance value high enough to exclude such residents, information on locations visited can be limited to locations visited by users traveling to the geographic area from another area. In an example, the distance can be about 200 miles.

Figure 9:
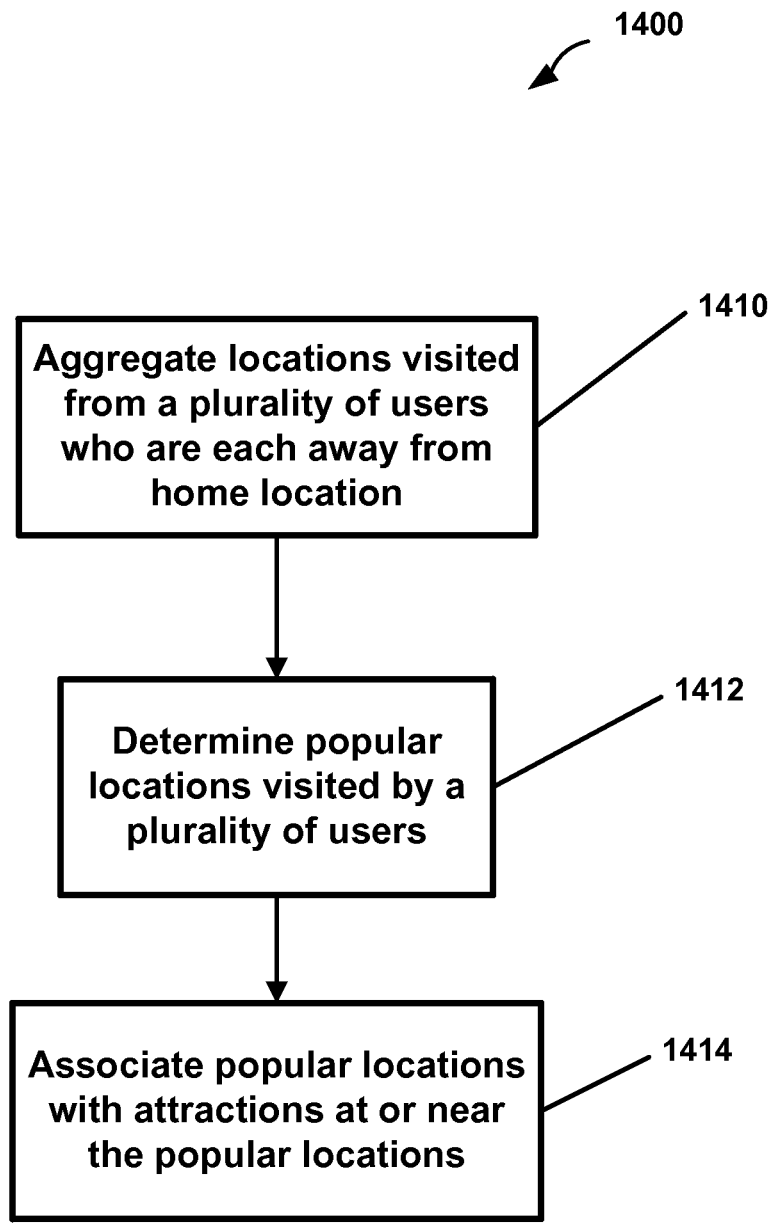
FIG. 9 is a flowchart of an example method for aggregating and analyzing locations visited by a plurality of users and associating popular locations with attractions within the geographic area.

FIG. 9 is a flowchart of an example method for aggregating and analyzing locations visited by a plurality of users and associating popular locations with attractions within the geographic area. If the distance between a location visited by a user and an associated home location of the user is greater than the predetermined distance (e.g., 200 miles), the data associated with the visited location can be utilized in the process 1400 shown in FIG. 9 to determine attractions within a geographic area. The process 1400 includes a step 1410 of aggregating information representing locations visited by a user with information representing locations visited by one or more other users, where the locations visited by each user are at least a distance away from a home location associated with the user. The data can be aggregated into a form similar to that shown in FIG. 8 for the location history data of a single user. For example, a table can be constructed in which each row represents a location visited by a particular user. The table can include information such as the longitude, latitude, time span, date of the user's visit, and accuracy radius. In some examples, the data can also include information entered by users regarding the particular attraction visited (e.g., if the user selected among a plurality of possible attractions returned during a local search or entered an attraction name manually).

The aggregated information on locations visited by a plurality of users within a geographic area can provide a heat map that highlights locations visited with great frequency. The process 1400 can include a step 1412 for determining these popular or frequently visited locations within the geographic area. This can be accomplished by utilizing a clustering algorithm similar to the process discussed above when determining locations visited by a single user from a plurality of raw location history data points. In this case, however, the raw location history data points are replaced by visited location data points from a plurality of users traveling within the geographic area. By utilizing a clustering process twice (first on raw position data points from a single user, and second on locations visited by a plurality of users), variations and errors in position acquisition can be further reduced and/or filtered out to determine a more accurate position of a popular location.

As discussed above, clustering can be accomplished in a variety of manners. In some examples, a centroid can be calculated from a group of proximately-spaced visited location data points. In other examples, the positions of each visited location can be reverse geocoded and clustered based on the resulting addresses for each location. Regardless of the particular clustering process employed, the end result can be a listing of locations that are frequently visited by a plurality of users traveling away from home within a geographic area. Furthermore, the clustering process can utilize information from the aggregated visited location data to determine and rank the frequency with which each popular location was visited by the plurality of users. For example, the clustering process can report the number of visited location data points used in calculating a centroid (i.e., the number of points in a cluster). Because each visited location data point can represent a visit by a particular user, the number of points utilized in calculating a centroid represents the number of users that visited the location. This number can be used in subsequent analysis to, for example, rank attractions by popularity, etc. Clustering can produce a listing of one or more popular locations and each location can have associated therewith a geographic position (e.g., a latitude and longitude), an accuracy radius, an array of visit times (e.g., a listing of start and end time pairs for each user's visit), and a number of visitors. In some examples, each location can also have associated therewith an array containing attractions names selected or inputted by each user as described above.

The process 1400 can also include a step 1414 for associating the one or more popular locations with attractions located at or near to each popular location. The step 1414 can include the use of a local search engine to determine one or more possible attractions based on the geographic position of the popular location. In addition, when executing a local search based on the geographic position of the popular location, the search can be limited to one or more categories of results representative of attractions and/or destinations in a geographic area. These can include, for example, "attractions," "theaters," "restaurants," "parks," etc.

Results listings returned from a local search engine can also be augmented by data collected from individual users via check-ins, status updates, user attraction labeling, or other sources of information (e.g., pictures featuring the attraction, emails mentioning the attraction, etc.). For example, if a local search based on the position of a popular location returns two or more possible attractions for the location, but a large number of users who visited the popular location provided check-in information or otherwise identified one of the possible attractions, this information can be used to select the correct attraction. By way of further example, if data representing a popular location includes an array of user-inputted or selected attraction names, the array can be cross-referenced with the local search results to select the correct attraction.

Figure 10:
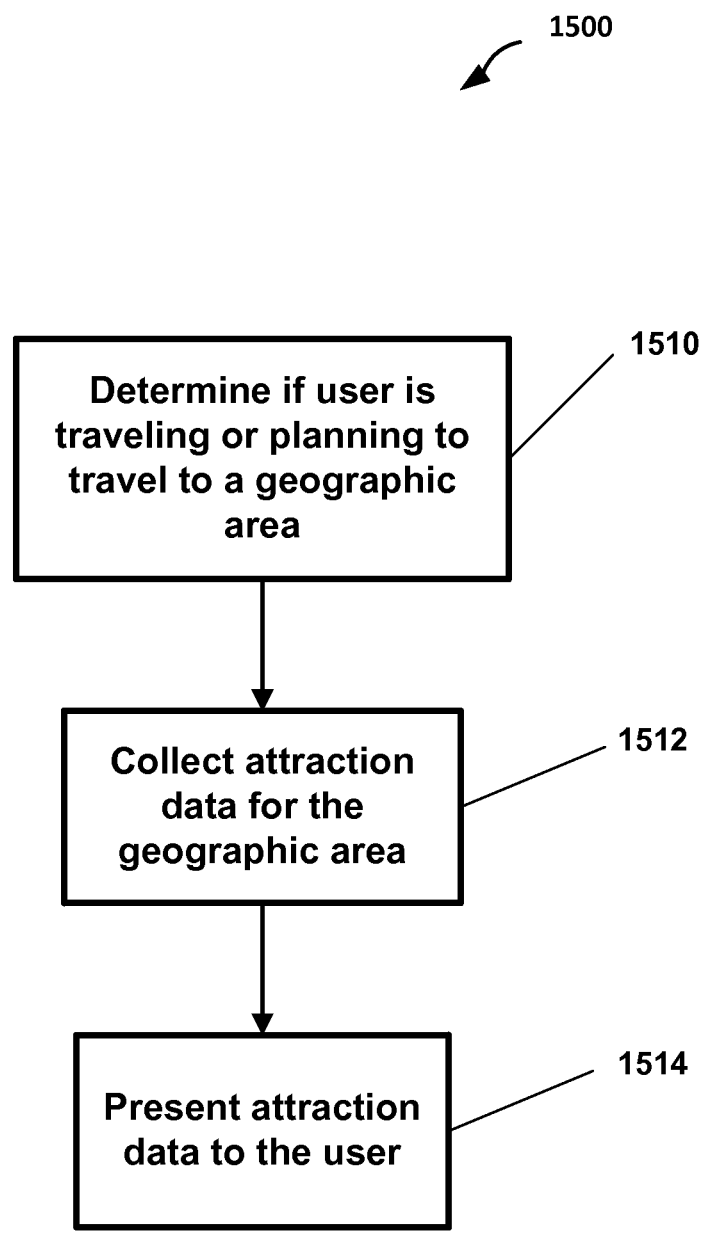
FIG. 10 is a flowchart of an example method for presenting popular attractions within a geographic area to a user.

The determination of popular attractions and/or destinations within a geographic area can be useful for a variety of purposes. For example, a listing of popular attractions for an area can be presented to a user that is found to be traveling—or planning to travel—within the area. FIG. 10 illustrates an example method for providing data on popular attractions within an area to a user. In step 1510, a system can determine if a user is traveling within, or planning to travel to, a geographic area. For example, if a user activates his or her mobile device after getting off an airplane, the mobile device may report that the location of the user is far away from an associated home location for the user (e.g., the user may be in a different city, state, or country). In such a scenario, the method can include step 1512 for collecting attraction data for the geographic area in which the user is traveling. The method can include, for example, accessing location history data collected as discussed above and analyzing the data to determine a listing of popular attractions within the geographic area. This listing can be presented to the user via the mobile device, as shown by step 1514.

Providing popular attraction data upon arrival in a geographic area is not the only example of process 1500, however. In some examples, method step 1510 can include determining in advance if a user is planning to travel to a particular geographic area. This determination can be made in a number of ways, including, for example, by analyzing emails (e.g., emails including travel itineraries, tickets purchases, etc.), calendar information, social media interactions (e.g., discussions of an upcoming trip, etc.), search engine queries (e.g., "hotels in Paris, France," etc.), and other sources of information. If planned travel to a geographic area is indicated by any of these sources, the method can include collecting and analyzing data from other users traveling within the area as discussed above, and presenting popular attraction data to the user via, for example, recommended activities, advertisements, search engine results, etc.

The methods and systems described herein can have a number of modifications, all of which are considered within the scope of the disclosure. For example, each component of the methods and systems described herein can be configured to execute continually or periodically on either a fixed schedule or upon demand. Location history data for a particular user, for example, can be collected continually or periodically by a mobile device and communicated to a location server 1150 or other system component immediately upon acquisition or periodically. Similarly, the reduction processes of clustering location history data points to determine locations visited by a user, the aggregation of visited locations from a plurality of users traveling away from their home locations, the clustering of visited locations to determine popular locations, and the association of popular locations with attractions can be conducted continually or periodically. Still further, results from the methods described herein can be added incrementally to previously compiled results, such that a history of popular attractions over time can be developed and computing resources can be conserved. By way of example, in one example the processes for collecting location history data described herein can run continually, and the process of determining locations visited from the raw location history data can be run on a nightly basis. Furthermore, in certain examples, the processes described herein for aggregating collected information from a plurality of users and determining popular attractions can be run on a weekly basis and the results can be combined with previously-compiled attraction data.

In some examples, the data utilized in determining popular attractions in a geographic area can be filtered using a variety of criteria to produce results for a particular time period or for a particular user. For example, in some examples, data can be filtered by date to determine popular attractions for a given time period, such as a season (e.g., summer), a month, etc. By filtering the data in this manner, seasonal or other time-dependent attractions can be highlighted or excluded (e.g., baseball stadiums are less likely to be popular attractions during winter months, etc.). Alternatively, data from all available time periods can be utilized to provide a comprehensive listing of popular attractions in a geographic area over time.

In other examples, data can be filtered based on one or more characteristics of a user to provide results more likely to be accurate for the user. For example, if a user having one or more characteristics associated therewith (e.g., age, sex, interests, occupation, etc.) conducts a search for attractions in a given city, the methods disclosed herein can aggregate information representing locations visited by a plurality of users where each user included in the data set has associated therewith one or more similar characteristics. Accordingly, a listing of popular attractions presented to the user can represent attractions frequently visited by other similar users (e.g., other males of similar age, other users with children, etc.). The one or more characteristics can be collected or inferred from information entered by the user in a personal profile, status updates, emails, calendaring information, etc., subject to user opt-in and in accordance with any existing privacy policies.

In some examples, a technique includes receiving, by a computing system, e.g., maps server 150, an indication of a current location of a mobile device, and retrieving, by the computing system, a maps search history associated with a user of the mobile device, the maps search history including a plurality of elements associated with map-based queries previously submitted by the use. The technique also includes determining, by the computing system, that one or more elements of the plurality of elements are relevant to the current location of the mobile device, and sending, by the computing system, to the mobile device, information relating to at least one of the one or more elements determined to be relevant to the current location of the mobile device.

For example, determining that the one or more elements of the plurality of elements are relevant to the current location of the mobile device may include, for each respective element of the plurality of elements, associating a respective geographic location with the respective element and adding the respective element to a set of relevant elements if the respective geographic location is within a predetermined threshold distance of the current location of the mobile device.

In some examples, the plurality of elements includes a directions query, and associating includes associating the directions query with a source geographic location and a destination geographic location. In some examples, the plurality of elements includes a query that returns a plurality of places. In some examples, the query includes one or more click entries indicating which of the plurality of places the user clicked on or otherwise selected after executing the query. In some examples, associating includes associating with the query the geographic locations of only those places that are indicated by the one or more click entries.

In some examples, the technique also includes de-duplicating the relevant elements by at least sending the relevant elements to a mapping application configured to add the element to a map and discard received elements that have already been added to the map, receiving from the mapping application an extracted set of elements previously added to the map, and replacing the relevant elements with the extracted set of elements.

In some examples, the technique also includes sorting the relevant elements based on at least one of: a proximity of a geographic location associated with each element to the current location of the mobile device; a frequency with which a query corresponding to each element was executed by the user; and how recently a query corresponding to each element was executed by the user.

In some examples, the technique also includes sending the information includes sending a notification including information relating to an element of the relevant elements.

In some examples, a computing system (e.g., maps server 150) includes at least one processor; and at least one module operable by the at least one processor to: receive an indication of a current location of a mobile device, retrieve a maps search history associated with a user of the mobile device, the maps search history including a plurality of elements associated with map-based queries previously submitted by the user; and determine that one or more elements of the plurality of elements are relevant to the current location of the mobile device.

In some examples, the at least one processor is disposed within at least one of the mobile device and a server. In some examples, the at least one module is further operable by the at least one processor to send, to the mobile device, information relating to at least one of the one or more elements determined to be relevant to the current location of the mobile device.

In some examples, the at least one module is further operable by the at least one processor to provide, to a display module that displays information, information relating to at least one of the one or more elements determined to be relevant to the current location of the mobile device.

In some examples, the at least one module is further operable by the at least one processor to, for each respective element of the plurality of elements, associate a respective geographic location with the respective element and adding the respective element to a set of relevant elements if the respective geographic location is within a predetermined threshold distance of the current location of the mobile device.

In some examples, the plurality of elements includes a directions query, wherein the at least one module is further operable by the at least one processor to associate the directions query with a source geographic location and a destination geographic location. In some examples, the plurality of elements includes a query that returns a plurality of places and that includes one or more click entries indicating which of the plurality of places the user clicked on or otherwise selected after executing the query. In some examples, the maps history processing module associates the query with the geographic locations of only those places that are indicated by the one or more click entries. In some examples, the maps history processing module de-duplicates the relevant elements by at least sending the relevant elements to a mapping application configured to add the element to a map and discard received elements that have already been added to the map, receiving from the mapping application an extracted set of elements previously added to the map; and replacing the relevant elements with the extracted set of elements.

In some examples, the maps processing module sorts the relevant elements based on at least one of: a proximity of a geographic location associated with each element to the current location of the mobile device; a frequency with which a query corresponding to each element was executed by the user; and how recently a query corresponding to each element was executed by the user.

In some examples, a computer-readable storage medium (e.g., on maps server 150) stores instructions that, when executed, cause at least one processor of a computing device to receive an indication of a current location of a mobile device, retrieve a maps search history associated with a user of the mobile device, the maps search history including a plurality of elements associated with map-based queries previously submitted by the user, determine that one or more elements of the plurality of elements are relevant to the current location of the mobile device, and send, to the mobile device, information relating to at least one of the one or more elements determined to be relevant to the current location of the mobile device.

Although a few examples have been described in detail above, other modifications are possible. Moreover, other mechanisms for performing the systems and methods described herein may be used. In addition, the logic flows depicted in the figures do not require the particular order shown, or sequential order, to achieve desirable results. Other steps may be provided, or steps may be eliminated, from the described flows, and other components may be added to, or removed from, the described systems.

Various examples have been described in this disclosure. These and other examples are within the scope of the following claims.

The invention claimed is:

1. A method comprising:
   receiving, by a processor, location history information for a plurality of mobile devices each associated with a respective user of a plurality of users, wherein the location history information includes one or more locations visited by each of the plurality of users;
   for each of the locations visited by each of the plurality of users:
      calculating, by the processor, a distance between a geographic position of the respective location visited by the respective user and a home location of the respective user; and
      determining, by the processor, whether the calculated distance is greater than a threshold distance to identify one or more locations visited by respective users that are greater than the threshold distance away from the respective home locations of the respective users;
   aggregating, by the processor, information for one or more locations that were visited by the respective users during a specified time period and identified as being greater than the threshold distance away from the respective home locations;
   determining, by the processor and based at least in part on the aggregated information, one or more popular locations within a defined geographic area;
   associating, by the processor, the one or more popular locations with one or more attractions located near the one or more popular locations; and
   presenting information regarding the one or more attractions within the defined geographic area to a user of the plurality of users.

2. The method of claim 1, wherein the one or more popular locations comprise locations visited by at least a threshold number of users during the specified time period.

3. The method of claim 1, wherein the threshold distance away from the home location is 200 miles.

4. The method of claim 1, further comprising clustering the location history information received for each of the plurality of mobile devices to identify a set of location history information data points for locations that are physically close to one another.

5. The method of claim 1, wherein the location history information comprises information representing a date, time, and geographic position of each of the plurality of mobile devices.

6. The method of claim 1, further comprising determining the one or more locations visited by each of the plurality of users by periodically analyzing location history information collected over a period of time.

7. A system comprising:
a location data receiving module that receives location history information from a mobile device, wherein the location history information includes one or more locations visited by the mobile device;
a location data processing module having a processor and a memory storing instructions that cause the processor to:
for each of the locations visited by the mobile device:
calculate, based on the location history information, a distance between a geographic position of the one or more locations visited by the mobile device and a home location associated with the mobile device;
determine whether the calculated distance is greater than a threshold distance to identify one or more locations visited by the mobile device that are greater than the threshold distance away from the home location associated with the mobile device;
aggregate information for the one or more identified locations visited by the mobile device during a specified time period with information for one or more additional locations visited by one or more additional mobile devices during the specified time period that are greater than the threshold distance away from a respective associated home location;
determine, based at least in part on the aggregated information, one or more popular locations within a defined geographic area based on the one or more locations visited by the mobile device and the one or more additional mobile devices;
associate the one or more popular locations with one or more attractions located near the one or more popular locations; and
present information regarding the one or more attractions within the geographic area to a user of the plurality of users.

8. The system of claim 7, wherein the one or more popular locations comprise locations visited by at least a threshold number of users during the specified time period.

9. The system of claim 7, wherein the location history information comprises a date, time, and geographic position of the mobile device.

10. The system of claim 7, wherein the location data processing module determines the one or more locations visited by the mobile device by clustering the location history information received from the mobile device to identify a set of location history information data points for locations that are physically close to one another.

11. The system of claim 7, wherein the threshold distance is 200 miles.

12. The system of claim 7, wherein the location data processing module determines the one or more popular locations by clustering the location history information for the mobile device and the one or more additional mobile devices to identify a set of location history information data points for locations that are physically close to one another.

13. The system of claim 7, wherein the location data processing module associates the one or more attractions with the one or more popular locations by executing a local search based on a geographic position of the one or more popular locations.

14. The system of claim 13, wherein the local search is limited to one or more categories of results.

15. A method comprising:
receiving, by a processor, location history information for a plurality of mobile devices each associated with a respective user of a plurality of users, wherein the location history information includes one or more locations visited by each of the plurality of users;
for each of the locations visited by each of the plurality of users:
calculating, by the processor, a distance between a geographic position of the respective location visited by the respective user and a home location of the respective user; and
determining, by the processor, whether the calculated distance is greater than a threshold distance to identify one or more locations visited by respective users that are greater than the threshold distance away from the respective home locations of the respective users;
filtering, by a processor, the one or more identified locations based on one or more characteristics of the users to aggregate information regarding only locations visited by a subset of the plurality of users that share the one or more characteristics;
determining, by a processor and based at least in part on the aggregated information, one or more popular locations within a defined geographic area;
associating, by the processor, the one or more popular locations with one or more attractions located near the one or more popular locations; and
presenting information regarding the one or more attractions within the defined geographic area to a user of the plurality of users.

16. The method of claim 15, wherein determining the one or more popular locations comprises clustering the location history information received for each of the plurality of mobile devices to identify a set of location history information data points for locations that are physically close to one another.

17. The method of claim 15, wherein the threshold distance is 200 miles.

18. The method of claim 15, wherein associating the one or more attractions with the one or more popular locations comprises executing a local search based on a geographic position of the one or more popular locations.

19. The method of claim 15, wherein the local search is limited to one or more categories of results.

* * * * *